United States Patent [19]

Miller et al.

[11] Patent Number: 4,552,729

[45] Date of Patent: Nov. 12, 1985

[54] METHOD FOR REMOVING TIN FROM SODIUM TUNGSTATE SOLUTION

[75] Inventors: Michael J. Miller, Towanda; Martin C. Vogt, Monroeton; Richard A. Scheithauer, Towanda, all of Pa.

[73] Assignee: GTE Products Corporation, Stamford, Conn.

[21] Appl. No.: 679,419

[22] Filed: Dec. 7, 1984

[51] Int. Cl.$^4$ .............................................. C01G 41/00
[52] U.S. Cl. ........................................ 423/55; 423/56; 423/58
[58] Field of Search ...................... 423/55, 58, 593, 56

[56] References Cited

U.S. PATENT DOCUMENTS 1,399,705  12/1921  Ekeley et al. ...................... 423/56
4,311,679   1/1982  Queneau et al. .................... 423/55
4,320,094   3/1982  Menashi et al. .................... 423/55
4,448,755   5/1984  Scheithauer et al. ............... 423/56

Primary Examiner—H. T. Carter
Attorney, Agent, or Firm—L. Rita Quatrini; Donald R. Castle

[57] ABSTRACT

A method is disclosed for removing tin from aqueous sodium tungstate solutions. The method involves adding ammonia to the sodium tungstate solution, adjusting the pH to above about 9.5 with an acid, adding magnesium chloride to form insoluble material containing the major portion of the tin, silicon, arsenic and phosphorus and a resulting sodium tungstate solution containing the major portion of the tungsten, and separating the insoluble material from the resulting solution.

5 Claims, No Drawings

METHOD FOR REMOVING TIN FROM SODIUM TUNGSTATE SOLUTION

FIELD OF THE INVENTION

This invention relates to a method for removing tin from sodium tungstate solutions.

BACKGROUND OF THE INVENTION

In the processing of tungsten ores, concentrates and scraps to pure tungsten chemicals, the source material is first digested with sodium hydroxide or sodium carbonate to yield an impure sodium tungstate solution. In this digestion, other elements such as arsenic, phosphorus, silicon, tin, etc., are also solubilized.

It has been common practice to remove arsenic and phosphorus from this impure sodium tungstate solution by formation of sparingle soluble salts as magnesium ammonium arsenate and magnesium ammonium phosphate. Because of the pH conditions of this removal step, silicon is simultaneously removed from the solution. However, tin is not reliably removed in this or in any other subsequent treatment step. Most of the tin which is solubilized in the initial digestion process remain with the final tungsten product when existing purification methods are employed.

Therefore, a method to effectively remove tin from the impure sodium tungstate solution would be desirable.

SUMMARY OF THE INVENTION

In accordance with one aspect of this invention there is provided a method for removing tin from sodium tungstate solutions. The method involves adding ammonia to the sodium tungstate solution, adjusting the pH to above about 9.5 with an acid, adding magnesium chloride to form insoluble material containing the major portion of the tin and a resulting sodium tungstate solution containing the major portion of the tungsten, and separating the insoluble material from the resulting solution.

DETAILED DESCRIPTION

For a better understanding of the present invention, together with other and further objects, advantages, and capabilities thereof reference is made to the following disclosure and appended claims in connection with the foregoing description of some of the aspects of the present invention.

This invention relates to a method for removing tin from sodium tungstate solutions.

The sodium tungstate solution results from the digestion of tungsten ore, concentrates, or scraps with sodium hydroxide or sodium carbonate. However, any impure sodium tungstate solution can be used. The solutions generally can contain arsenic, phosphorus, silicon and other impurities in addition to tin. Generally the tungsten levels in the solution are from about 200 to about 240 grams per liter with from about 215 to about 225 grams per liter being preferred. Tin is usually present at from about 500 parts per million on a tungsten weight basis.

The method of this invention involves the addition of ammonia or ammonium hydroxide and magnesium chloride to the sodium tungstate solution to form compounds of arsenic and phosphorus which are sparingly soluble at a pH of greater than about 9.3. The compound of tin, formed in this process is believed to be stannic acid, which is sparingly soluble at a pH of >9.5. The tin in the form of the sparingly soluble compound can be physically removed from the sodium tungstate solution.

Ammonia or ammonium hydroxide is first added to the sodium tungstate solution. The pH is then adjusted to the desired value with an acid, preferably a mineral acid with sulfuric acid being especially preferred. The pH is critical. If the pH falls below about 9.5, the tin is not always subtantially reduced, that is, reduced to from about 2 to about 3 mg Sn per liter. The desired pH ranges are from about 9.5 to about 10.0 with from about 9.6 to about 9.8 being preferred. The pH adjusted solution is then agitated for a suffient time, generally a half hour to allow the pH to stabilize. Magnesium chloride is then added to the ammonia treated pH adjusted solution. The resulting mixture is then agitated for a period of time generally about 12 hours to allow formation of the sparingly soluble compounds of tin, arsenic, phosphorus and silicon. The mixture is then allowed to settle for a period of time, generally about 3 hours, so the material containing the compound of tin can settle out.

The amounts of ammonia or ammonium hydroxide and magnesium chloride which are added are sufficient to react with the major portion of the arsenic, phosphorus and possibly others to form sparingly soluble compounds. Typical values are given in the examples that follow.

After the insoluble material has settled out, it is then removed from the resulting solution by any standard technique such as filtration. The resulting solution contains the major portion of the tungsten.

To more fully illustrate this invention, the following non-limiting examples are presented. All parts, portions, and percentages are by weight unless otherwise stated.

EXAMPLE 1

To about 1 liter of sodium tungstate solution having a specific gravity of about 1.320 and containing about 230 grams of tungsten is added about 26 milliliters of ammonium hydroxide with stirring. The pH is adjusted to the desired value with concentrated sulfuric acid and agitated for about ½ hour to allow the pH to stabilize. About 17.4 grams of magnesium chloride which has been dissolved in about 35 to about 40 milliliters of deionized water is then added and the resulting mixture is stirred for about 1½ hours. The mixture is then allowed to settle for about 3 hours. The insoluble material is then separated from the sodium tungstate solution by filtration.

|  | Mg Sn/l |
| --- | --- |
| Solution before treatment | 80–100 |
| Solution after treatment (pH = 8.9) | 69 |
| Solution after treatment (pH = 9.2) | 20 |
| Solution after treatment (pH = 9.8) | <1 |

EXAMPLE 2

The procedure in example 1 is upscaled and a series of solutions is processed, some at pH=9.3±0.1. while others are processed at a pH=9.7±0.1. Data is given below.

| pH = 9.3 | | |
| --- | --- | --- |
| mg Sn/l Before | mg on/l After | Treatment |

-continued

| Treatment | Treatment | pH |
|---|---|---|
| \multicolumn{3}{c}{pH = 9.3} | | |
| 26 | 15 | 9.2 |
| 31 | 8 | 9.4 |
| 37 | 23 | 9.3 |
| 37 | 34 | 9.2 |
| 17 | 4 | 9.3 |
| 17 | 3 | 9.2 |

| mg Sn/l Before Treatment | mg Sn/l After Treatment | treatment pH |
|---|---|---|
| 40 | <2 | 9.8 |
| 41 | 3 | 9.8 |
| 14 | <2 | 9.6 |
| 21 | <2 | 9.6 |
| 24 | 2 | 9.8 |
| 26 | 2 | 9.7 |

Examples 1 and 2 show that tin is more effectively removed at the higher pH range.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for removing tin from aqueous sodium tungstate solutions said process comprising:
   (a) adding ammonia to said sodium tungstate solution;
   (b) adjusting the pH of the ammonia-treated sodium tungstate solution to above about 9.5;
   (c) adding magnesium chloride to the pH adjusted sodium tungstate solution to form insoluble material containing the major portion of the tin and a resulting solution containing the major portion of tungsten; and
   (d) separating the insoluble material from the resulting solution.

2. A process according to claim 1 wherein the ammonia treated sodium tungstate solution is adjusted to a pH of from about 9.5 to about 10.0 with an acid.

3. A process according to claim 1 wherein the acid is a mineral acid.

4. A process according to claim 3 wherein the acid is sulfuric acid.

5. A process according to claim 1 wherein the tin content of said aqueous sodium tungstate solution is >about 20 mg/l and the tin content of said resulting solution is ≦about 3 mg/l.

* * * * *